(12) United States Patent
Lesani et al.

(10) Patent No.: US 6,322,619 B1
(45) Date of Patent: *Nov. 27, 2001

(54) INK COMPOSITIONS

(75) Inventors: Fereshteh Lesani, Santa Clara, CA (US); Marcel P. Breton; James D. Mayo, both of Mississauga (CA)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/511,127

(22) Filed: Feb. 22, 2000

(51) Int. Cl.$^7$ .................................................. C09D 11/00
(52) U.S. Cl. ................... 106/31.43; 106/31.75; 106/31.28; 106/31.86; 106/31.58
(58) Field of Search ............... 106/31.43, 31.75, 106/31.28, 31.58, 31.86, 31.87

(56) References Cited

U.S. PATENT DOCUMENTS

| | | | |
|---|---|---|---|
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,041,161 | 8/1991 | Cooke et al. | 106/22 |
| 5,111,220 | 5/1992 | Hadimioglu et al. | 346/140 R |
| 5,121,141 | 6/1992 | Hadimoglu et al. | 346/140 R |
| 5,122,187 | 6/1992 | Schwarz et al. | 106/25 |
| 5,124,718 | 6/1992 | Koike et al. | 346/1.1 |
| 5,128,726 | 7/1992 | Cassano et al. | 355/308 |
| 5,371,531 | 12/1994 | Rezanka et al. | 347/43 |
| 5,667,568 | 9/1997 | Sacripante et al. | 106/20 R |
| 5,688,312 | 11/1997 | Sacripante et al. | 106/31.49 |
| 5,700,316 | 12/1997 | Pontes et al. | 106/31.58 |
| 5,747,554 | 5/1998 | Sacripante et al. | 523/161 |
| 5,844,020 | 12/1998 | Paine et al. | 523/161 |
| 5,932,630 | 8/1999 | Kovacs et al. | 523/161 |
| 6,001,899 | * 12/1999 | Gundlach et al. | 523/160 |
| 6,086,661 | * 7/2000 | Malhotra et al. | 106/31.43 |
| 6,174,355 | * 1/2001 | Mayo et al. | 106/31.43 |

OTHER PUBLICATIONS

"Electroluminescence of doped organic thin films", Tang et al., *J. Appl. Phys.*, 65 (9), May. 1, 1989, p. 3610–3616.

* cited by examiner

Primary Examiner—C. Melissa Koslow
Assistant Examiner—Veronica F. Faison
(74) Attorney, Agent, or Firm—E. D. Palazzo

(57) ABSTRACT

An ink composition comprised of (1) a vehicle, (2) a mixture of colorants, and (3) a polyquaternary ammonium salt.

26 Claims, No Drawings

INK COMPOSITIONS

REFERENCE TO COPENDING APPLICATIONS AND PATENTS

Illustrated in U.S. Ser. No. 09/511,126, filed concurrently herewith, the disclosure of which is totally incorporated herein by reference, is a process which comprises the development of an image on a substrate containing a hydrophilic layer; and in U.S. Ser. No. 09/510,552, filed concurrently herewith, the disclosure of which is totally incorporated herein by reference, an ink composition comprised of a colorant, potassium iodide, and a poly(quaternary amine), and which ink possesses a pH of from about 7.5 to about 12. Disclosed in U.S. Pat. No. 6,132,499, the disclosure of which is totally incorporated herein by reference, is an ink composition comprised of (1) a carbamate or thiourea each with a melting point of from about 60° C. to about 120° C. and an acoustic-loss value of from about 25 to about 80 dB/mm, (2) an alcohol compound with melting point of about 25° C. to about 90° C. and with an acoustic-loss value of from about 5 to about 40 dB/mm, (3) a lightfastness component, (5) an antioxidant, and (6) a colorant; in U.S. Pat. No. 6,174,355, the disclosure of which is totally incorporated herein by reference, is an ink composition comprised of a colorant and poly(diallyl diethyl ammonium) bromide; and in U.S. Pat. No. 6,180,691, the disclosure of which is totally incorporated herein by reference, is a process for the preparation of an ink which comprises mixing an ink vehicle, a colorant and a latex containing a polymer with epoxy groups, and wherein said latex is generated by the polymerization of a mixture of olefinic monomers, and wherein at least one of said olefinic monomers is an unsaturated epoxide monomer and which polymerization is accomplished in the presence of an anionic surfactant, and a nonionic surfactant.

Also, illustrated in U.S. Pat. Nos. 5,688,312; 5,667,568; 5,700,316; 5,747,554; 5,844,020 and 5,932,630, the disclosures of which are totally incorporated herein by reference, are ink compositions, and particularly acoustic inks, and processes thereof.

A number of the components of the above copending application and patents, such as the colorants, ink additives, and the like may be selected for the inks of the present invention in embodiments thereof.

BACKGROUND OF THE INVENTION

The present invention is directed to ink compositions and, more specifically, the present invention relates to aqueous inks formulated with a mixture of colorants and preferably wherein the inks contain a poly(diallyl dialkyl ammonium) halide, such as poly(diallyl dimethyl ammonium)chloride, and which inks are especially useful for acoustic ink printing, processes and apparatuses, reference for example U.S. Pat. No. 5,121,141, U.S. Pat. No. 5,111,220, U.S. Pat. No. 5,128,726, and U.S. Pat. No. 5,371,531, the disclosures of which are totally incorporated herein by reference, including especially aqueous ink acoustic ink processes as illustrated in copending application U.S. Ser. No. 09/510,552, the disclosure being totally incorporated herein by reference.

There can be generated with such inks excellent developed images on plain and coated papers with acceptable image permanence, excellent projection efficiency on transparencies without a post fusing step, and excellent crease resistance, and wherein the inks possess acceptable, and in embodiments superior lightfastness, and superior waterfastness.

PRIOR ART

Known are ink compositions comprised of water, a colorant, and a monomeric oxazolidinone compound; an ink composition comprised of an aqueous liquid vehicle, a pigment, and a vesicle-forming lipid, wherein vesicles of the lipid are present in the ink; an ink composition comprised of water, a colorant, a nonionic surfactant, and a fluorinated component; and a thermal ink jet printing which comprises incorporating into a thermal ink jet printer an ink composition comprising water; a colorant of a dye or pigment; a hydroxyamide derivative having at least one hydroxyl group and at least one amide group or a reaction product of oxyalkylene(s) and a sulfur-containing humectant that is a sulfoxide or a sulfone or a thiol derivative.

U.S. Pat. No. 4,751,528, the disclosure of which is totally incorporated herein by reference, discloses a semi-solid hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level.

Further, U.S. Pat. No. 4,791,439, the disclosure of which is totally incorporated by reference, discloses an apparatus for use with semi-solid hot melt inks having an integrally connected ink jet head and reservoir system.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose semi-solid hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like. The inks of the present invention are dissimilar than the aforementioned '179 and '187 in that, for example, the invention vehicle selected displays an important acoustic loss value and a viscosity of from about 1 to about 20, and preferably about 10 centipoise when heated to a temperature of from about 125° C. to about 165° C., such that acoustic energy in the printhead can eject an ink droplet onto paper.

U.S. Pat. No. 5,041,161, the disclosure of which is totally incorporated herein by reference, discloses an ink jet ink which is semi-solid at room temperature.

U.S. Pat. No. 4,853,036 and U.S. Pat. No. 5,124,718 disclose an ink for ink jet recording which comprises a liquid composition essentially comprising colorant, a volatile solvent with a vapor pressure of 1 millimeter Hg or more at 25° C., and a component that is solid at room temperature and having a molecular weight of 300 or more.

In U.S. Pat. No. 5,688,312 there are disclosed inks with a number of colorants, and which inks may be selected for acoustic ink printing.

SUMMARY OF THE INVENTION

While the known ink compositions and processes may be suitable for their intended purposes, a need remains for acoustic aqueous ink compositions suitable for ink jet printing. In addition, there is a need for aqueous ink compositions which are compatible with a wide variety of plain papers and generate photographic quality images on coated papers without the use of carbon black pigments or high cost specialty black colorants, said colorants often having lower solubility in ink vehicles containing waterfastness additives such as those used in the present invention. Further, there is a need for aqueous ink compositions which generate high quality, lightfast, and excellent waterfast images on plain papers and on many commercial thermal ink jet photopapers. There is also a need for aqueous ink jet ink compositions which generate high quality, fast-drying images on a wide variety of plain papers at low cost with high quality text and high quality graphics, and wherein the colorant, such as the dye, is retained on the paper surface while the ink vehicle can continue to spread within the paper structure. Further, there is a need for aqueous ink jet ink compositions which exhibit minimal feathering. Additionally, there is a need for aqueous ink jet ink compositions which exhibit minimal intercolor bleed. There is also a need for aqueous ink jet ink compositions which exhibit excellent image permanence. Further, there is a need for aqueous ink jet ink compositions which are suitable for use in acoustic ink jet printing processes. Additionally, there is a need for aqueous ink compositions suitable for ink jet printing processes wherein the substrate is heated prior to printing and is cooled to ambient temperature subsequent to printing (delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. These and other needs can be achievable with the inks of the present invention in embodiments thereof.

SUMMARY OF THE INVENTION

Examples of features of the present invention include, for example:

It is a feature of the present invention to provide aqueous ink compositions with many of the advantages illustrated herein.

It is another feature of the present invention to provide process black aqueous ink compositions suitable for acoustic ink jet printing.

It is yet another feature of the present invention to provide aqueous ink compositions which are compatible with a wide variety of plain papers and yield photographic quality images on coated papers.

It is still another feature of the present invention to provide aqueous ink compositions which generate high quality images on plain papers and ink jet photopapers, and wherein there is selected a mixture of dyes, or wherein the ink vehicle contains a waterfastness additive and a salt.

Another feature of the present invention is to provide aqueous ink jet ink compositions comprised of a mixture of dyes, and wherein in embodiments the inks possess a low viscosity of, for example, from about 1 to about 10 at the jetting temperature.

Yet another feature of the present invention is to provide aqueous ink jet ink compositions which exhibit low viscosity of from about 1 to about 10 centipoise at a temperature of from about 20° C. to about 60° C.

Still another feature of the present invention is to provide ink compositions which exhibit minimal intercolor bleed.

It is another feature of the present invention to provide ink jet ink compositions which exhibit excellent waterfast, stability, and lightfast thus excellent overall image permanence.

Another feature of the present invention resides in the provision of aqueous inks wherein the viscosity of the ink is from about 1 centipoise to about 10 centipoise at, for example, the jetting temperature which can be from about 20° C. to about 60° C., and preferably from about 30° C. to about 50° C. thereby enabling excellent jetting at reasonable power levels.

Aspects of the present invention include an ink composition comprised of (1) a vehicle, (2) a mixture of colorants, and (3) a polyquaternary ammonium salt; an ink wherein the mixture of colorants is comprised of a cyan colorant, a magenta colorant, and a yellow colorant; an ink composition wherein the salt is poly(diallyldimethyl ammonium) halide; an ink composition wherein the vehicle is water; an ink composition wherein the liquid vehicle is water present in an amount of about 50 weight percent to about 85 weight percent; an ink composition wherein the ink is an aqueous ink; an ink composition wherein the vehicle is selected from the group consisting of (1) water, (2) sultolane, and (3) butyl carbitol; an ink composition wherein the vehicle is comprised of a mixture of water and a cosolvent; an ink composition wherein the mixture of colorants is comprised of a mixture of dyes; an ink composition wherein the colorant mixture is comprised of two to four dyes; an ink composition further containing biocides, humectants, or mixtures thereof; a printing process which comprises incorporating into an acoustic ink jet printer the ink illustrated herein, and causing droplets of the ink to be ejected in imagewise pattern onto a substrate; a process which comprises (a) providing an acoustic ink printer with a pool of the liquid ink with a free surface and a printhead including at least one droplet ejector for radiating the free surface of the ink with focused acoustic radiation to eject individual droplets of ink therefrom on demand, the radiation being brought to focus with a finite waist diameter in a focal plane, and causing droplets of the ink illustrated herein to be ejected in imagewise pattern onto a substrate; an ink composition wherein the colorant mixture is selected in an amount of from about 0.5 to about 20 percent by weight; an ink composition wherein the vehicle is present in an amount of about 50 to about 99 weight percent, the colorant is present in an amount of about 1 to about 10 weight percent, and the salt is present in an amount of about 0.5 to about 10 weight percent, and wherein the total of the components is about 100 percent; an ink composition wherein the colorant is comprised of a mixture of cyan, magenta, and yellow acid dyes, wherein the dyes are in a ratio of 1:2.24:1.45, respectively, and which mixture is present in the ink in an amount of about 1 to about 10 weight percent; an ink composition with a viscosity of from about 1 centipoise to about 20 centipoise, and a waterfastness of from about 70 to about 100 percent; an ink composition wherein the salt is polyquaternary ammonium halide; an ink composition wherein the salt is a polyquaternary chloride; an ink composition wherein the salt is a polyquaternary bromide; an ink composition wherein the colorant mixture contains from at least two colorants; an ink composition wherein the colorant mixture contains dyes and pigments; an ink composition wherein the colorant mixture is comprised of dyes; an aqueous ink comprised of a vehicle, a mixture of at least colorants and a polyquaternary ammonium component; and an ink containing a metal halide; aqueous or water based ink composition comprised of (1) a vehicle; (2) colorant comprised of a mixture of dyes; (3) an optional buffer, (4) a metal halide salt and (5) a polyquaternary ammonium salt additive; and ink composition comprised of (1) a vehicle; (2) a mixture of colorants of cyan, magenta, and yellow dyes and wherein there is enabled a black ink; (3) a buffer, (4) a metal halide salt and (5) a polyquaternary ammonium salt additive to primarily provide for excellent lightfastness, high waterfastness, for example from about 70 to about 100 percent, and high optical densities of, for example, from about 1.1 to about 1.5.

DETAILED DESCRIPTION OF THE INVENTION

A number of known ink vehicles can be selected for the invention inks. Examples of the liquid vehicle selected for the inks include water, or a mixture of water and a miscible organic component, such as betaine, ethylene glycol, propylene glycol, diethylene glycols, glycerin, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof. The liquid vehicle is generally present in an amount of from about 40 to about 99.5 percent by weight, preferably about 55 to about 95 percent by weight, and more preferably from about 60 to about 90 percent by weight, although the amount may be outside these ranges in embodiments. Also, there can be selected other vehicles not specifically recited herein.

A number of known colorants can be selected for the inks of the present invention, and which colorants are present in various suitable amounts. Preferably a mixture of three or more colored dyes are selected, that is a cyan, magenta, and yellow dye, and which mixture is present in the ink in an amount of, for example, about 1 to about 20, and preferably from about 3 to about 10 weight percent. Specific examples of dyes are Acid Blue 9, CI #42090 Projet Magenta 3B-OA, Projet Magenta IT available from Zeneca Inc., Acid Red 249, CI #18134, and Projet Yellow OAM or Acid Yellow 23, CI #19140. The preferred amount ratio of the three dyes is 1:2.24:1.45 for the cyan:magenta:yellow dyes, respectively.

Also of importance with respect to the present invention is the presence in the ink of an ink component of a poly quaternary ammonium salt, such as poly(diallyl dimethyl ammonium) chloride, poly(diallyl dimethyl ammonium) bromide, poly(diallyl diethyl ammonium) bromide, poly(diallyl diethyl ammonium) chloride in an amount of, for example, from about 0.5 to about 10 percent by weight.

The inks of the present invention may also contain an alkali metal halide of, for example, the formula AX where A is Na or K and X is either CI, Br or I, and which salt is present, for example, in an amount of from about 0.1 to about 10 percent by weight and preferably from about 2 to about 5 percent by weight. Preferably, the inks contain potassium iodide in an amount sufficient to stabilize the dye/poly quaternary ammonium salt complex.

Suitable colorants, preferably present as a mixture to enable, for example, a process black ink and present in an effective amount generally of from about 1 to about 25, and for example from about 2 to about 12 percent by weight, include pigments and dyes, pigments, dyes, mixtures of pigments, mixtures of dyes, and the like with acid dyes being preferred. Any suitable dye or pigment may be selected providing, for example, that it is capable of being substantially dispersed or dissolved in the vehicle and is compatible with the other ink components.

Examples of suitable pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (Red Orange), (Matheson, Colemen Bell), Sudan II (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (Du Pont), Paliogen Black L0084 (BASF), Pigment Black K801 (BASF), and carbon blacks such as REGAL 330® (Cabot), Carbon Black 5250, Carbon Black 5750 (Columbia Chemical Company).

Examples of suitable dyes include those as illustrated herein, Pontamine; Food Black 2; Carodirect Turquoise FBL Supra Conc. (Direct Blue 199), available from Carolina Color and Chemical; Acid Blue 9 available from Tricon Colors, Hoechst; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Acid Red 249, available from Tricon Colors, and Projet Magenta 1T from Zeneca; Drimarene Brilliant Red X-2B (Reactive Red 56), available from Pylam, Inc.; Direct Red 227 available from Tricon Colors; Acid Red 52 available from Tricon Colors, and Zeneca (Projet Magenta OAM); Projet Magenta 3B-OA from Zeneca; Intrajet Liquid Magenta KRP from Crompton and Knowles; Levafix Brilliant Red E-4B, available from Mobay Chemical; Levafix Brilliant Red E6- BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow #23), available from Sandoz, Inc and Zeneca (Projet Yellow OAM).; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like.

Optional ink additives include biocides such as DOWICIL™ 150, 200, and 75, benzoate salts, sorbate salts, and the like, present in effective amounts, such as for example an amount of from about 0.0001 to about 2 percent by weight, and preferably from about 0.01 to about 1.0 percent by weight. The amount of biocide is generally present in amounts of from about 10 to 25 milligrams per one gram of ink. Other ink additives, such as humectants, and the like can also be incorporated into the inks.

The inks of the present invention can be prepared by any suitable method. An aqueous ink composition can be prepared by, for example, mixing the components at room temperature, optionally followed by heating to a temperature of about 40° C. and stirring for a period of for example, about 60 minutes until it forms a homogeneous solution, and subsequently it is cooled to about 25° C. and filtered through a 1 micron filter. Filters with pore size as little as 0.2 micron are also suitable.

The inks of the present invention are particularly suitable for printing processes wherein the substrate, such as plain paper, coated paper, transparency, or the like, is heated during the printing process to facilitate drying of the images. When transparency substrates are employed, temperatures typically are limited to about 100° C. to about 110° C., since the polyester typically employed as the base sheet in transparencies tends to deform at higher temperatures, however, specially formulated transparencies and paper substrates can tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

The inks of the present invention are also suitable for use in acoustic ink jet printing processes. In acoustic ink jet printing, an acoustic beam exerts a radiation pressure against features upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. The size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of page width ejector arrays, ranging from (i) single row, sparse arrays for hybrid forms of parallel/serial printing to (ii) multiple row staggered arrays with individual ejectors for each of the pixel positions or addresses within a page width image field (i.e., single ejector/pixel/line) for ordinary line printing. Inks suitable for acoustic ink jet printing typically are liquid at ambient temperatures (i.e., about 25° C.), however, in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in J. Appl. Phys., vol. 65, no. 9 (1 May 1989) and references therein, the disclosure of which is totally incorporated herein by reference.

Water is selected for the inks of the present invention, however preferably a cosolvent is present to improve the long term stability of the ink, that is to eliminate the formation of a precipitate over a period of at least 1 year and preferably up to 5 years or longer.

The optical density and color gamut measurements recited herein were obtained on a Gretag Macbeth SpectroScan with a Gretag Spectrolino.

The lightfast values of the ink jet images were measured in the Mark V Lightfast Tester obtained from Microscal Company, London, England.

The waterfast values of the ink jet images were obtained from the optical density data recorded before and after washing with 22° C. water for five minutes.

Specific Examples of the invention will now be described in detail. These Examples are intended to be illustrative, and the invention is not limited to the materials, conditions, or process parameters set forth in these embodiments. All parts and percentages are by weight unless otherwise indicated.

EXAMPLE I

An ink composition was prepared as follows. A solution was prepared by combining at room temperature, about 22° C. throughout, and in the following order, 18.0 grams of sulfolane, 19.71 grams of deionized water, 12.0 grams of a 40 weight percent solution of poly(diallyldimethyl ammonium chloride), available from Calgon Corporation under the commercial name Calgon CP-2253, 3.0 grams of potassium iodide, 3.0 grams of trizma 33.64 percent of trizma hydrochloride tris(hydroxy methyl aminomethane hydrochloride) and 66.36 of tris(hydroxymethyl aminomethane), pH about 7.2, pre-set crystals, pH=8.5, available from Sigma, 0.25 gram of butyl carbitol and 10.47 grams of a 9.14 weight percent solution of Acid Blue 9, available from Tricon Corporation, 17.22 grams of a 12.5 weight percent solution of Projet Magenta 3B-OA available from Zeneca, and 16.35 percent by weight of a 8.5 weight percent solution of Acid Yellow 23, available from Zeneca under the trade name of Projet Yellow OAM. The solution resulting was then stirred at room temperature for an additional one hour and then filtered through a 1 micron glass fiber filter available from Gelman Sciences. The resulting ink was printed on Xerox Color Xpressions and Xerox 4024 DP papers using a HP1600C printer with both glossy and plain paper modes. The color space (L,a,b), optical density, waterfastness and lightfastness properties of the image formed are shown in the following table:

|  | Xerox Color Xpressions | | Xerox 4024 DP | |
| --- | --- | --- | --- | --- |
|  | Glossy | | | |
| Printing Mode | Paper Mode | Plain Paper Mode | Glossy Paper Mode | Plain Paper Mode |
| L | 25.06 | 25.2 | 22.3 | 22.7 |
| a | 0.35 | −0.32 | −0.06 | −0.11 |
| b | 0.07 | 0.42 | −0.25 | −0.01 |
| OD | 1.43 | 1.37 | 1.46 | 1.42 |
| Waterfastness | 71 | 78.5 | 85.3 | 86.3 |
| Lightfastness | 98.5 | 95.1 | 97.5 | 96 |

Neutral black images of very high lightfastness and good waterfastness were obtained with the ink of the present invention.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) a vehicle, (2) a mixture of colorants, and (3) a polyquaternary ammonium salt.

2. An ink in accordance with claim 1 wherein the mixture of colorants is comprised of a cyan colorant, a magenta colorant, and a yellow colorant.

3. An ink composition in accordance with claim 1 wherein said salt is poly(diallyldimethyl ammonium) halide.

4. An ink composition in accordance with claim 1 wherein said vehicle is water.

5. An ink composition in accordance with claim 1 wherein the liquid vehicle is water present in an amount of about 50 weight percent to about 85 weight percent.

6. An ink composition in accordance with claim 1 wherein said ink is an aqueous ink.

7. An ink composition in accordance with claim 1 wherein the vehicle is selected from the group consisting of (1) water, (2) sulfolane, and (3) butyl carbitol.

8. An ink composition in accordance with claim 1 wherein the vehicle is comprised of a mixture of water and a cosolvent.

9. An ink composition in accordance with claim 1 wherein said mixture of colorants is comprised of a mixture of dyes.

10. An ink composition in accordance with claim 1 wherein said mixture is comprised of two to four dyes.

11. An ink composition in accordance with claim 1 further containing biocides, humectants, or mixtures thereof.

12. A printing process which comprises incorporating into an acoustic ink jet printer the ink of claim 1, and causing droplets of the ink to be ejected in imagewise pattern onto a substrate.

13. A process which comprises (a) providing an acoustic ink printer with a pool of the liquid ink of claim 1 with a free surface and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

14. An ink composition in accordance with claim 1 wherein the colorant mixture is selected in an amount of from about 0.5 to about 20 percent by weight.

15. An ink composition in accordance with claim 1 wherein the vehicle is present in an amount of about 50 to about 99 weight percent, the colorant mixture is present in an amount of about 1 to about 10 weight percent, and the salt is present in an amount of about 0.5 to about 10 weight percent, and wherein the total of said components is about 100 percent.

16. An ink composition in accordance with claim 1 wherein the colorant is comprised of a mixture of cyan, magenta, and yellow dyes, wherein said dyes are in a ratio of 1:2.24:1.45, respectively, and which mixture is present in the ink in an amount of about 1 to about 10 weight percent.

17. An ink composition in accordance with claim 1 with a viscosity of from about 1 centipoise to about 20 centipoise, and a waterfastness of from about 70 to about 100 percent.

18. An ink composition in accordance with claim 1 wherein said salt is polyquaternary ammonium halide.

19. An ink composition in accordance with claim 1 wherein said salt is a polyquaternary ammonium chloride.

20. An ink composition in accordance with claim 1 wherein said salt is a polyquaternary ammonium bromide.

21. An ink composition in accordance with claim 1 wherein said colorant mixture contains at least two colorants.

22. An ink composition in accordance with claim 1 wherein said colorant mixture contains dyes and pigments.

23. An ink composition in accordance with claim 1 wherein said colorant mixture is comprised of dyes.

24. An ink in accordance with claim 21 containing a metal halide.

25. An ink in accordance with claim 1 containing a metal halide.

26. An ink composition in accordance with claim 1 wherein the colorant is comprised of a mixture of a cyan acid dye, a magenta acid dye and a yellow acid dye.

* * * * *